W. H. LAWSON.
CENTRIFUGAL SEPARATOR.
APPLICATION FILED JUNE 17, 1910.
1,038,607.
Patented Sept. 17, 1912.
3 SHEETS—SHEET 3.
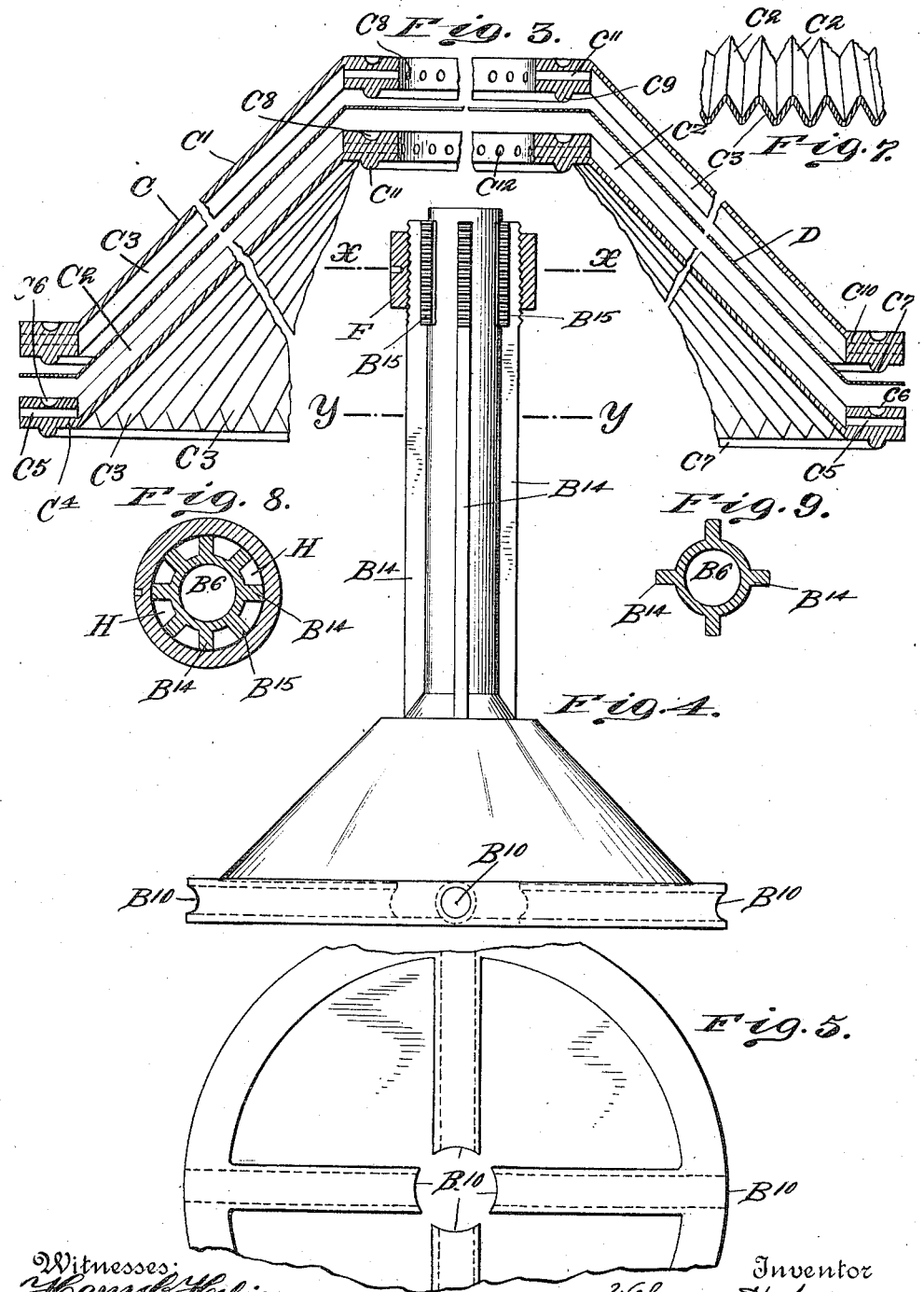

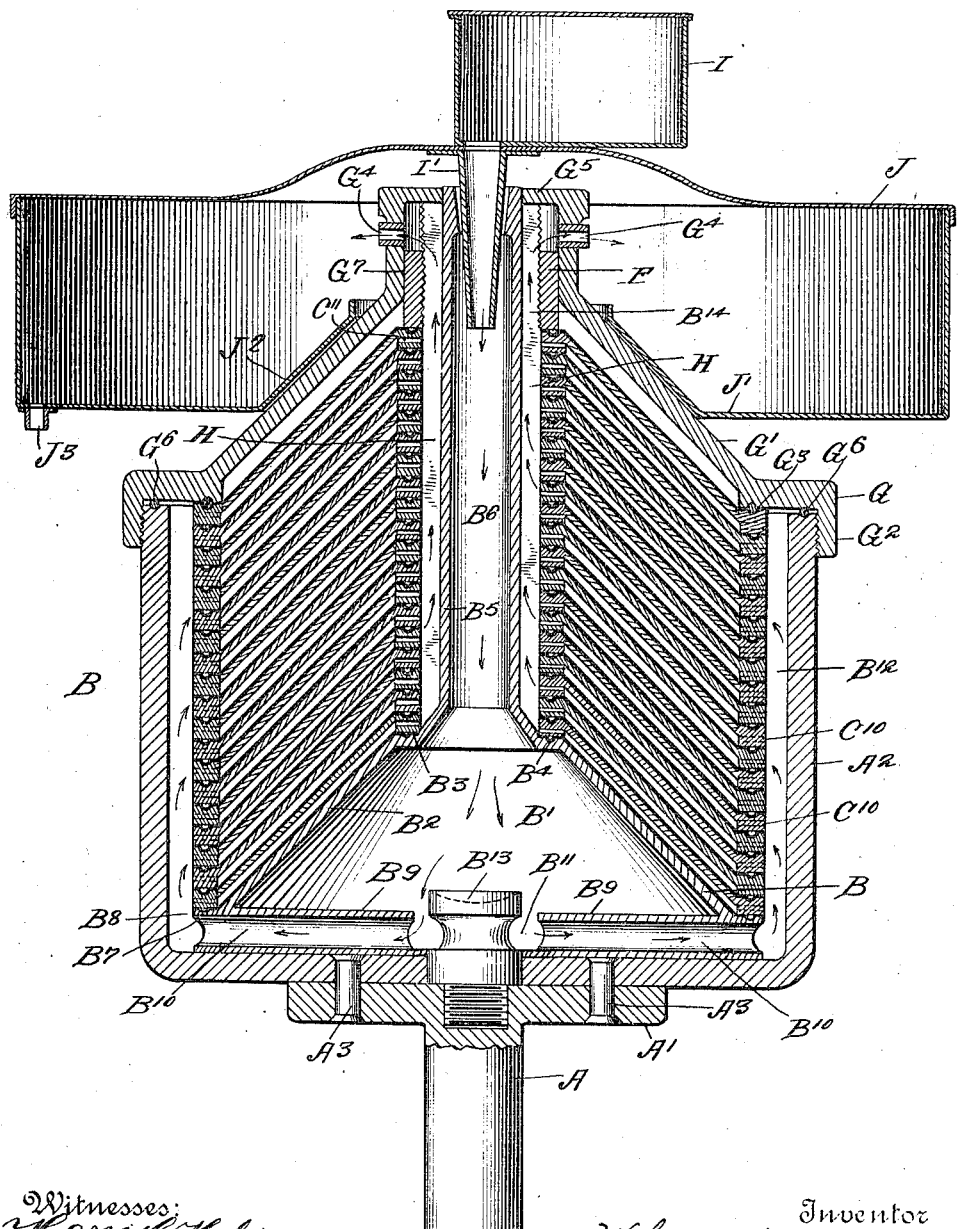

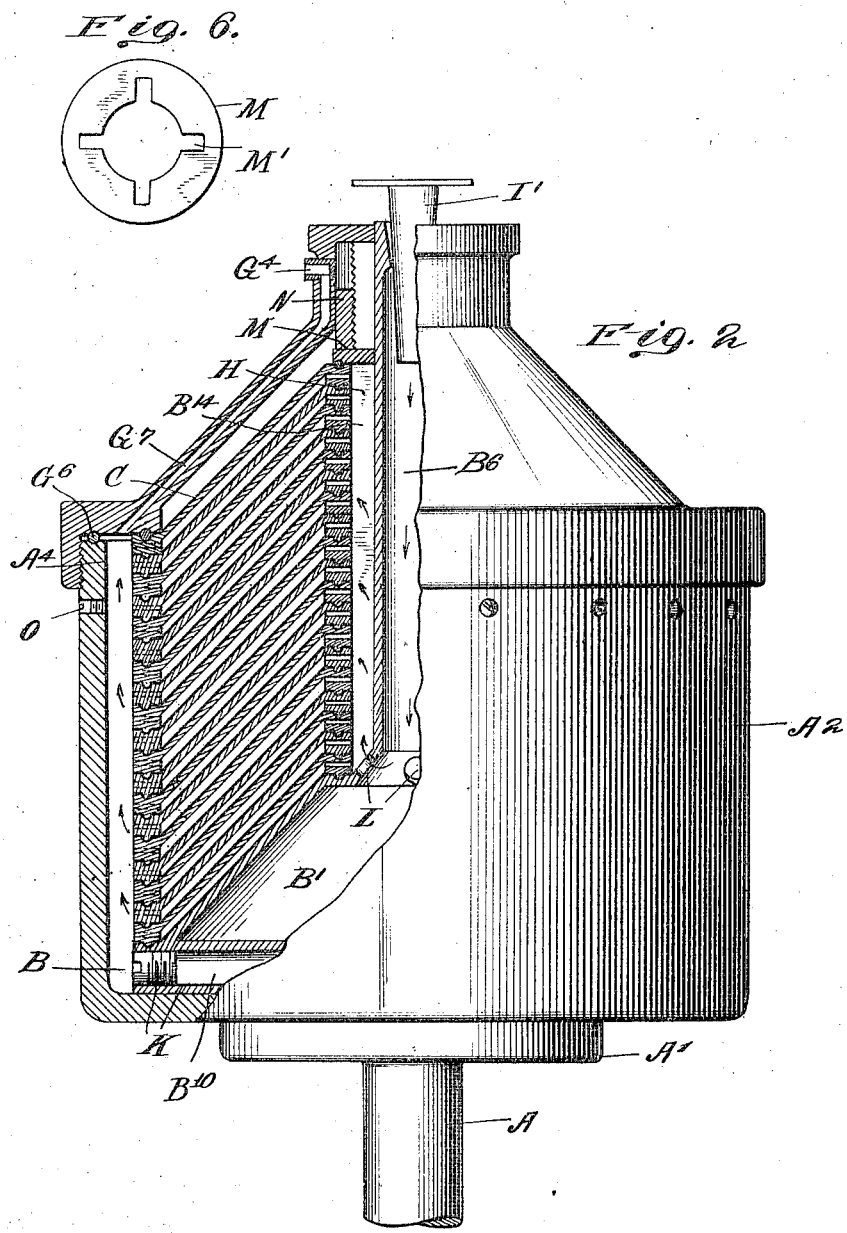

UNITED STATES PATENT OFFICE.

WELCOME H. LAWSON, OF POUGHKEEPSIE, NEW YORK.

CENTRIFUGAL SEPARATOR.

1,038,607.  Specification of Letters Patent.  Patented Sept. 17, 1912.

Application filed June 17, 1910. Serial No. 567,365.

*To all whom it may concern:*

Be it known that I, WELCOME H. LAWSON, a citizen of the United States, and a resident of Poughkeepsie, in the county of Dutchess and State of New York, have invented certain new and useful Improvements in Centrifugal Separators, of which the following is a specification.

My invention relates to centrifugal separating machines and the object of my invention is to provide a machine of this character which will separate the fluids from the solids.

In carrying out my invention, I provide a preliminary clarification by centrifugal force in a rapidly rotated compartment. The heavier portion of the solids is deposited in this chamber adjacent to the periphery thereof and when this space is filled, the machine is stopped and the solids removed from said compartment. The lighter liquid flowing near the center of this compartment is led by an appropriate passage to the filtering compartment. This filtering compartment is connected so as to revolve with the first mentioned compartment. It is provided with a plurality of superimposed filtering sections which I have shown as cone shaped in form, and forming separator filtering chambers or channels, the liquid being led to each of these chambers from a passage near the outer surface of the filtering compartment and passes vertically upward or downward, depending on the arrangement of the plates and the connecting passages, through the filtering material, and is then led from each chamber to a passage which leads to the outlet.

By a slight change in the arrangement of the passages, I am able to cause the liquid to flow from the first mentioned compartment upwardly adjacent to the inlet conduit which is located at the center or in line with the axis of rotation of the bowl, and then downwardly by centrifugal action and through the filtering material to the outer periphery of the separating elements, or I may cause the liquid to flow from said first chamber directly to the periphery of the bowl and then through the separating medium inwardly toward the axis of the bowl and thence to the outlet.

Referring to the drawings, which form a part of this specification, Figure 1, is a central sectional vertical view through a separating machine embodying my invention. Fig. 2, is a view disclosing a modified construction. Fig. 3, is a fragmentary sectional view through two of the cone shaped plates, the plates being separated and disclosing the filtering paper located between same. Fig. 4, is a vertical elevational view disclosing the exterior appearance of the central conduit and chamber which is located within the separator bowl. Fig. 5, is a bottom view of the construction illustrated in Fig. 4. Fig. 6, is a plan view of a washer which is used in the construction disclosed in Fig. 2. Fig. 7, is a fragmentary view shown partly in section of a portion of one of the separator plates and illustrates the shape of the channels formed therein. Fig. 8, is a cross sectional view on line $x$—$x$ of Fig. 4. Fig. 9, is a cross sectional view on line $y$—$y$ of Fig. 4.

In view of the fact that to illustrate the filtering paper or cloth used as a filtering medium and located between the cone shaped plates, the said paper or filtering medium is illustrated in Figs. 1 and 2 by heavy black lines, but, the exact construction is clearly illustrated in Fig. 3, in which the filtering medium is shown in cross section.

A, indicates a vertical shaft having a flanged top A' on the top of which is mounted the separator bowl $A^2$, the said separator bowl and flange A' being connected together by rivets $A^3$. Resting within the bowl $A^2$ on the bottom thereof is a casting B having a chamber B' provided with inclined top walls $B^2$ on the top of which is formed a shoulder $B^3$ which is provided with an annular groove $B^4$, and extending upwardly from said shoulder to the top of the bowl is a tubular portion $B^5$ the interior $B^6$ of which forms the inlet conduit through which fluid flows downward to the chamber B'. The casting B is further provided with a circular flange $B^7$ which extends around the base of the inclined wall $B^2$, and is provided with an annular groove $B^8$. The lower rim of the bottom of the wall $B^2$ contacts with the bottom of the bowl $A^2$, to form a closure of the chamber B', and an opening from the chamber B' to the inner periphery of the bowl $A^2$ is provided by casting a plurality of tubes indicated by $B^9$ integral with the casting B, thereby providing passages $B^{10}$ which lead from the chamber B' by way of the annular opening $B^{11}$ to the annular chamber $B^{12}$. The inner ends of the tubes $B^9$ are extended at the lower sides to abut the sides of a plug $B^{13}$ which is screwed into the top of the flange $A'$, and this serves to center the casting B and hold it from lateral movement relative to the bowl $A^2$.

Referring to Fig. 3, C indicates one of the cone shaped separating plates, a number of which are used in superimposed relation as illustrated in Figs. 1 and 2. Each of these plates is provided with a body portion indicated by $C'$ which is formed corrugated in shape to provide U or V shaped channels $C^2$—$C^2$, etc., on one side of the plate, and $C^3$—$C^3$, etc., on the opposite side, and formed integral with said plates at the bottom edge thereof is a circular flanged portion $C^4$ provided with holes indicated by $C^5$. This flanged portion is also provided with annular grooves $C^6$ on one side, and annular projecting beads indicated by $C^7$ on the opposite side. Formed integral with the body portion $C^2$ at the top thereof is an annular collar portion which is provided with annular grooves indicated by $C^8$ and annular projections indicated by $C^9$. D indicates paper or other suitable filtering material formed in sheets and laid between the upper surface of the cone shaped element C and the lower surface of the opposite cone shaped elements, its upper and lower edges being forced into the annular grooves $C^6$ and $C^8$, respectively, by the projecting beads $C^7$ and $C^9$ respectively, and as the projecting beads enter the grooves carrying the edges of the paper therein, the paper is strengthened to some degree and held firmly in said recesses, and by this means, a perfect liquid-tight joint is also secured between the element C at both points, so that fluid introduced into the chambers $C^2$ under pressure due to the centrifugal action of the bowl, will not be forced past said joints. The holes $C^5$ communicate with the chambers formed in the upper surface of the element C and the holes $C^{10}$ indicated by dotted lines communicate with the channels $C^3$ formed in the lower side of the element C. The holes $C^{11}$ communicate with the channels $C^3$ and the holes $C^{12}$ indicated by dotted lines communicate with the channels $C^2$ and when the elements C are connected together in superimposed relation with the filtering paper D between them, the lower edges of the channels $C^3$ are set in alinement with the upper edges of the channels $C^2$ thereby holding and supporting the filtering paper D throughout the distance from the top collar to the lower flange and forming on each side of said filtering paper V shaped channels which are in open communication with each other through the pores of the paper D, as will be readily understood.

The casting B is provided with four wings $B^{14}$ which extend from the shoulder $B^3$ to nearly the top of the casting and near the top end are four extra wings indicated by $B^{15}$ and spaced equal distance between the wings $B^{14}$ and the upper edges of said wings are threaded as indicated to permit the ring F to screw thereon. G indicates a cover which is provided with a cone shaped top $G'$ and the cover is provided with a threaded flange $G^2$ which engages with a screw on the bowl, whereby the cover is connected to the bowl. The cover G is provided with outlets $G^4$ for fluid and is also provided with an inwardly extending flange $G^5$ which overlaps the tops of the wings $B^{14}$ and $B^{15}$, so that when the cover is screwed down to its fixed position and clamps the packing material $G^6$ to form a joint between the cover and bowl, the flange $G^5$ will rest on the tops of the wings $B^{14}$ and $B^{15}$ and force the element B firmly against the bottom of the bowl $A^2$, as will be readily understood.

The elements C are assembled as illustrated in Fig. 1, in superimposed relation with the filtering medium clamped between them as heretofore set forth, and are held at their outer edges by the cover G acting through the packing ring $G^3$, and at their inner edges by the ring F which is screwed down on the top of the collar portions as illustrated, the collar F extending from the wings $B^{14}$ to the inner wall of the top of the cover at the point indicated by $G^7$. By the arrangement of the elements C when assembled a plurality of vertical passages H are provided which are in open communication with the holes $C^{11}$ in the collar portion of the element C. It will be noted that the holes $C^{11}$ communicate with the channels $C^3$ and that the holes $C^{12}$ communicate with the channels $C^2$.

I indicates a receptacle provided with a depending spout $I'$ into which the fluid to be separated such as milk for illustration is poured, and J indicates a receptacle which is provided with a bottom $J'$ from which extends upwardly, a cone shaped portion $J^2$ which is supported close to the surface of the cover $G'$, but not in contact therewith.

The vessel J is provided with an outlet $J^3$. The difference between the construction disclosed in Fig. 1 and that of Fig. 2 lies in the fact that in the use of the construction shown in Fig. 2 the passages $B^{10}$ are closed by a screw plug K, and the passages L—L, etc., in the casting B are provided. A further change consists in forming a passage $G^7$ in the cover G which communicates with the outlet passage $G^4$, and the top of the passages H are closed by a ring M which fits over the top wings $B^{14}$ and $B^{15}$, and the outer edge of which rests on the top of the top elements C, and a shorter ring than the ring $G^7$, indicated by N is used, by means of which the elements C are held together.

In using the construction shown in Fig. 1, a part of the fluid to be separated is fed into the receptacle I and passes downward through the spout I' and passage $B^6$, into the chamber B', where the heavier particles are thrown to the periphery of the chamber B' by the centrifugal action of the bowl, which is rotated through the medium of the shaft A, and the lighter particles are forced to the center of the chamber B' and pass downward through the passages $B^{11}$ and $B^{10}$ to the annular chamber $B^{12}$ and thence through the openings $C^5$ and $C^{10}$ (see Fig. 3) indicated in dotted lines in Fig. 1, and thence through the filtering medium D to the passages $C^2$ and $C^3$ and through the passages $C^2$ through the openings $C^{11}$ and $C^{12}$ to the passages H and upward through said passages to the outlets $G^4$, where it is thrown by the centrifugal action into the vessel J, and carried therefrom through the outlet $J^3$, the solid portions being held on the under surfaces of the filtering medium D, in the channels $C^3$; and the top surfaces of the filtering material in the channels $C^2$. It is obvious, therefore, that the flow of the fluid to be separated flows upward in one channel through the filtering material D and downward in the adjacent channel through the filtering material D, so that the solids are deposited partly on the under side of said filtering medium, and partly on the upper side thereof.

It will be noted that in both constructions illustrated in Figs. 1 and 2, that the outlets $G^4$ are not far removed from the axis of the separator bowl, and that, therefore, the force tending to cause a separation of the fluids, is the difference between the radius from the axis of the bowl to said outlet $G^4$.

Referring to the operation of the construction illustrated in Fig. 2, the fluid is fed through the spout I' into the passage $B^6$ and downward to the channel B', where the heavier solids are separated by centrifugal force and lodged in the bottom of the chamber B', and the lighter fluid is carried upward through the openings L into the passage $B^{14}$ and through the openings $C^{11}$ and $C^{12}$ into the channels $C^3$ and $C^2$ respectively, and through the filtering medium D to the openings $C^{10}$ and $C^5$ respectively to the annular chamber $B^{12}$, and thence upward through the passages $A^4$ and $G^7$ to the outlets $G^4$. It will be seen, therefore, that the difference in constructions shown in Figs. 1 and 2 effect a difference in the direction of the flow between the elements C, and it will be noted that in each case the force of gravity tending to separate the fluids from the solids is the same, since the distance from the axis of the bowl to the fluid outlets $G^4$ is the same in each case.

If it is desired to increase the force in order to effect a more rapid separation, the plugs located in the sides of the bowl $A^2$ may be removed (see Fig. 2) from the bowl $A^2$ and the force of the centrifugal action tending to separate the solids from the fluids will be increased in proportion to the distance that the said outlets are located from the axis of the bowl relative to the outlets $G^4$, as will be readily understood.

In the constructions set forth, I have disclosed a separator of high efficiency and very simple in its parts, and have provided for the easy separation and cleaning of the parts.

Having thus described my invention what I claim as new is:

1. A bowl having a plurality of elements therein arranged in superimposed relation, each of said elements having radial channels formed in the upper and lower surfaces thereof; and a filtering medium clamped between said elements, said channels constraining the liquid to be filtered to pass from one element to the adjacent element, for the purpose set forth.

2. A bowl having a plurality of cone shaped elements therein arranged in superimposed relation, each of said cone shaped elements having channels formed in one of the surfaces thereof; and a filtering medium clamped between said elements, for the purpose set forth.

3. A bowl having a plurality of cone shaped elements therein arranged in superimposed relation, each of said cone shaped elements having channels formed in the upper and lower surfaces thereof; and a filtering medium clamped between said elements, for the purpose set forth.

4. A bowl having a plurality of cone shaped elements located therein, each of said elements comprising a body portion having channels in its upper and lower surfaces, and having a collar provided with openings which extend from said channels through said collar; said body portion also being provided with a circular flanged portion having openings which communicate with said channels and the interior of said bowl; and a filtering medium held between said elements.

5. In a centrifugal separator of the character described; a cone shaped element comprising a body portion provided with a plurality of radial channels formed in its upper and lower sides and having a collar portion and provided with a central opening at its inner periphery, which collar portion is provided with a plurality of passages which lead from certain of said channels to said central opening; said body portion being also provided with a circular flanged portion having openings which communicate with certain other of said channels and extend therefrom to the outer periphery of said flanged portion.

6. A bowl having a plurality of elements therein arranged in superimposed relation, each of said elements having separate independent channels formed in one of the surfaces extending from near the outer to near the inner periphery thereof; a filtering medium clamped between said elements; a tubular conduit extending through the center of said elements; and means for directing a fluid from said tubular conduit, between said elements and through said filtering medium to a passage leading to an outlet.

7. In combination, a bowl having a casting resting therein and supported by the bottom thereof; which casting is provided with a channel at its lower end and an upwardly extending tubular conduit communicating therewith; said casting being also provided with a plurality of wings, the upper ends of which are provided with a thread; a plurality of elements each of which is provided with channels; a filtering material located between said elements; a nut engaging said thread for clamping said elements firmly to said casting; said elements being provided with passages located in their outer and inner peripheries; and means for directing a fluid through said tubular conduit and through said passages and said filtering medium to an outlet.

8. In combination, a bowl; a casting resting in said bowl; and provided with a central conduit and a lower chamber; and having outlets located in the lower end of said chamber; a plurality of cone-shaped separator elements located in superimposed relation within said bowl; a filtering medium held between said elements; and means for leading a fluid to the outer periphery of said elements and between same to an outlet.

9. In combination, a bowl; a casting resting in said bowl; and provided with a central conduit and a lower chamber; and having outlets located in the lower end of said chamber; a plurality of cone shaped separator elements each of which is provided with a plurality of separate conduits, and located in superimposed relation within said bowl; a filtering medium held between said elements; and means for directing the fluid through said outlets to the outer periphery of said elements and between same to an outlet.

10. In combination, a bowl; a casting resting in said bowl; and provided with a central conduit and a lower chamber; and having outlets located in the lower end of said chamber; a plurality of separator elements each of which is provided with a plurality of separate radial conduits formed in both the upper and lower surfaces, and located in superimposed relation within said bowl; a filtering medium held between said elements; and means for directing the fluid through said outlets and clamped between the walls of said conduits to the outer periphery of said elements and between same through said filtering medium to an outlet.

11. In a centrifugal separator, a central conduit adapted to receive the liquid to be filtered, a plurality of superimposed cone-shaped filtering mediums surrounding said conduit, means for conducting the fluid to the outer periphery of said filtering mediums, said filtering mediums being adapted to receive respectively portions of the fluid, and to allow said portions to be filtered and to pass therethrough to the inner periphery thereof, and thence to be conducted to an outlet.

12. In a centrifugal separating machine, a cone shaped separator element provided with relatively thickened flanges at its inner and outer peripheries and passages located in said flanges.

13. In a centrifugal separating machine, a cone shaped separator element the surface of which is provided with a plurality of channels and the inner and outer periphery of which is provided with relatively thickened flanged portions having passages located therein which communicate with said channels.

14. In a centrifugal separating machine, a cone shaped separator element the surface of which is provided with a plurality of channels and the inner and outer periphery of which is provided with relatively thickened flanged portions having passages located therein which communicate with said channels, and having a depression or groove in said thickened flanged portion, for the purpose set forth.

15. In a centrifugal separating machine, a cone shaped separator element the surface of which is provided with a plurality of channels and the inner and outer periphery of which is provided with relatively thickened flanged portions, having passages located therein which communicate with said channels, and having a projection or beaded portion, for the purpose set forth.

16. In centrifugal separating machine having a cast portion comprising a lower portion having a chamber formed therein and an upwardly extending tubular portion having a passage extending from said chamber to the upper end of said casting, and having a plurality of wings extending from the outer periphery of said tubular portion, and having a shoulder formed on the top of said chamber, and a shoulder formed near the bottom thereof; a plurality of cone shaped separator elements provided with relatively thickened flanged portions at their outer and inner periphery; the lower element having its inner flanged portion resting on said top shoulder and its outer flanged portion resting on said last named shoulder, and means for holding said elements in contact with said shoulders.

17. In a centrifugal separating machine, the combination of a plurality of radially corrugated cone shaped elements arranged in superposed relation, the corrugation of one element being located opposite the corrugations in the adjacent element and contiguous therewith, so as to form independent ducts, and means for holding said elements in coöperative relation.

18. In a centrifugal separating machine, a plurality of separator elements comprising a cone shaped casting having a plurality of radial channels formed in the upper and lower surface, and each provided with a thickened flanged portion at its inner and at the outer periphery, said elements being held together in superposed relation and each of said elements being provided with passages in said outer and inner flanges, the passages in the inner periphery of one element communicating with the passages in the outer periphery of the adjacent element, substantially as described.

19. In a centrifugal separating machine, a plurality of separator elements each comprising a cone shaped casting having a plurality of radial channels formed in the upper and lower surface, and each provided with a thickened flanged portion at its inner and at the outer periphery, said elements being held together in superposed relation and each of said elements being provided with passages in said outer and inner flanges, the passages in the inner periphery of one element communicating with the passages in the outer periphery of the adjacent element, and a filtering medium located between said elements, substantially as described.

Signed at New York city in the county of New York and State of New York this 7th day of June A. D. 1910.

WELCOME H. LAWSON.

Witnesses:
 FRANK M. ASHLEY,
 A. T. SCHARPS.